United States Patent [19]

Paivinen et al.

[11] 3,765,003

[45] Oct. 9, 1973

[54] READ-WRITE RANDOM ACCESS MEMORY SYSTEM HAVING SINGLE DEVICE MEMORY CELLS WITH DATA REFRESH

[75] Inventors: John O. Paivinen, Huntington; Richard B. Rubinstein, New York; Leo Cohen, Commack; Lamar T. Baker, Farmingdale, all of N.Y.

[73] Assignee: General Instrument Corporation, Newark, N.J.

[22] Filed: Nov. 13, 1972

[21] Appl. No.: 305,936

Related U.S. Application Data

[63] Continuation of Ser. No. 809,223, March 21, 1969, abandoned.

[52] U.S. Cl. ........... 340/173 CA, 307/279, 307/304

[51] Int. Cl. ......................... G11c 11/24, G11c 7/00

[58] Field of Search ................. 340/173 R, 173 CA; 307/279, 304

[56] References Cited

UNITED STATES PATENTS

| | | | |
|---|---|---|---|
| 3,387,286 | 6/1968 | Dennard | 340/173 R |
| 3,461,312 | 8/1969 | Farber | 307/304 X |
| 3,474,259 | 10/1969 | Rodgers | 340/173 R |
| 3,480,796 | 11/1969 | Polkinghorn | 307/304 X |
| 3,506,851 | 4/1970 | Polkinghorn et al. | 307/304 X |

*Primary Examiner*—Bernard Konick
*Assistant Examiner*—Stuart Hecker
*Attorney*—Harold James

[57] ABSTRACT

A memory cell for use in a random access memory system comprises a single switching device having a data storing element operatively connected to one of its output terminals. The control terminal receives an address signal which is effective to actuate the switching device, thereby to transfer the data signal from the storing element to the other of its output terminals. Means are provided to refresh the level of the stored data signal after the performance of a "read" operation on the memory cell.

24 Claims, 7 Drawing Figures

INVENTORS
JOHN O. PAIVINEN
RICHARD B. RUBINSTEIN
LEO COHEN
LAMAR T. BAKER
BY James and Franklin
ATTORNEY INVENTORS
JOHN O. PAIVINEN
RICHARD B. RUBINSTEIN
LEO COHEN
LAMAR T. BAKER
BY
ATTORNEY INVENTORS
JOHN O. PAIVINEN
RICHARD B. RUBINSTEN
LEO COHEN
LAMAR T. BAKER
BY [signature]
ATTORNEY INVENTORS
JOHN O. PAIVINEN
RICHARD B. RUBINSTEIN
LEO COHEN
LAMAR T. BAKER
BY James and Franklin
ATTORNEY

READ-WRITE RANDOM ACCESS MEMORY SYSTEM HAVING SINGLE DEVICE MEMORY CELLS WITH DATA REFRESH

This is a Continuation of our prior U.S. application Ser. No. 809,223, filed Mar. 21, 1969, now abandoned and having the same title as this application.

The present invention relates generally to binary or digital memory systems, and particularly to a novel memory cell for use in such systems, and to means for refreshing the data levels stored thereat.

One of the basic units of a binary computer system is the random access, read - write memory in which data, usually in bit form at one of two discrete logic levels, is stored at a plurality of locations or addresses. In a "read" operation the logic bit stored at the selected address is "sensed" at that address and transferred to a memory output terminal. For a write operation, new data is steered into the selected address to store a new data bit at that address.

In an application Ser. No. 780,005 filed on Nov. 29, 1968, now U.S. Pat. No. 3,599,180, in the name of Richard B. Rubinstein et al. and entitled *Random Access Read-Write Memory System Having Data Refresing Capabilites and Memory Cell Therefor*, assigned to the assignee of the present application, a memory system of this type is disclosed in which the memory cells are stored at locations defined by the intersections of a plurality of rows and columns. Each memory cell there disclosed comprises three switching devices in the form of field effect transistors (FET s). Field effect transistors have been found particularly suitable for use in the design of memory systems of this type because of their high speed of operation, low power dissipation, and their ability to be fabricated by large scale integrated circuit techniques. The data is stored on a capacitor connected to the control terminal or gate of one of these switching devices. The second switching device when actuated transfers the stored data signal to an output terminal during a predetermined portion of the clock cycle, and the switching device, actuated by a timed signal, is effective to supply a data refresh signal to the storing element during a read operation, or a new data signal to that element during a write operation.

Data refreshing in that system was found necessary because of the inherent tendency of the data signal to drain or leak from the data storage capacitor over a period of time. As a result, data refreshing was performed either periodically, or on all data storing elements in a selected row during a read operation, and on all data storing elements in that row except the one into which new data is inserted during a write operation.

While that system has proven to be highly effective and practical in use, the requirement of three FETs for each of the memory cells, and particularly in light of the fact that such memories may comprise thousands of such memory cells capable of storing thousands of bits of data, necessitates the use of a relatively large number of field effect transistors, even though that system in turn provided a reduction in the number of transistors required for memory cell operation as compared to the then previously known memories. The presumed need for that relatively large number of field effect transistors in each memory cell,and thus in the entire memory system,caused an inevitable reduction in the storage density of data in that system and increased the cost, complexity and power dissipation of that system.

It is therefore an object of the present invention to provide a memory system utilizing field effect transistors in the memory cells thereof, in which the required number of such transistors in a given memory cell is reduced.

It is another object of the present invention to provide a random-access memory system having increased data storage capacity as well as reduced power dissipation.

It is yet another object of the present invention to provide a memory system of the type described in which only a single switching transistor is required in a memory cell of that system.

It is yet another object of the present invention to provide a memory system of the type described in which the data signal at each of the memory cells is refreshed during an addressing operation on that cell by means of a novel and improved refresh amplifier.

It is a more specific object of the present invention to provide a refresh amplifier for use in restoring the data level at the memory cells in a memory system in which means are provided to compensate for the effects of variations in the source voltage in that system and in the threshold voltage on the various semiconductor chips which may be utilized in a complete memory system.

It is yet a further object of the present invention to provide a random access, read-write memory system utilizing a minimum number of switching transistors having the capability of being readily fabricated in an integrated circuit.

To these ends, a random access memory system is described in which data is stored at a plurality of memory cells arranged in a predetermined manner to define a plurality of data addresses or locations. Each memory cell comprises a single switching device in the form of a field effect transistor having a control terminal or gate, and a pair of output terminals designated as the source and drain. A data storing element, at which a data signal is to be stored at one of two discrete logic levels, is operatively connected to one of the output terminals, and an addressing signal is selectively applied to the gate and is effective when present to actuate the transistor, thereby to operatively connect the source and drain and to transfer the data signal from the storing element to an output node to which the second output terminal is operatively connected.

As herein specifically described, the memory cells are arranged at locations defined by the intersection of a plurality of rows and columns, the addressing signal applied to the gate being a row select signal. Each memory cell in a given column is operatively connected to a common conductor. As a result of the configuration of the memory cell of this invention,a read operation is inherently destructive of the stored data signal. That is, the performance of a read operation tends to erase the data signal stored at the selected memory cell. To prevent data destruction upon a read operation, a novel refresh amplifier is operatively connected to that conductor. A second switching device actuated by a timed signal is operatively interposed between the amplifier input and output, the amplifier being effective to sense the stored data level at the data storing element in the selected row and, upon the actuation of that second switching device, to transfer a refreshing data signal back to that storing element. The refresh amplifier described herein is particularly suited for use with the single device memory cell of this invention in that it returns to the data storing element a signal of the proper polarity and at an enhanced level in a substantially instantaneous manner. This is achieved by providing a feedback path between the amplifier output and an intermediate node of the amplifier, and by maintaining the actuating nodes of the amplifier at predetermined bias levels which make the switching devices in the amplifier quickly responsive to changes in the signal level at the amplifier input. Means are provided to compensate for variations in a source voltage supplied to the amplifier so as to maintain those predetermined bias levels. Further means are provided to compensate for possible variations in the threshold voltage of the various semiconductor chips which may be utilized to form a memory system.

Each of the common conductors is operatively connected to the memory output terminal through a third switching device which is actuated upon the receipt of a column select signal so that only the data signal stored at the selected column (and the selected row) is transferred to the output terminal and thus represents the stored signal at the selected address.

To the accomplishment of the above, and to such other objects as may hereinafter appear, the present invention relates to a random access memory system and a single device memory cell therefor, as defined in the appended claims and as described in this specification taken together with the accompanying drawings in which:

Figure 1:
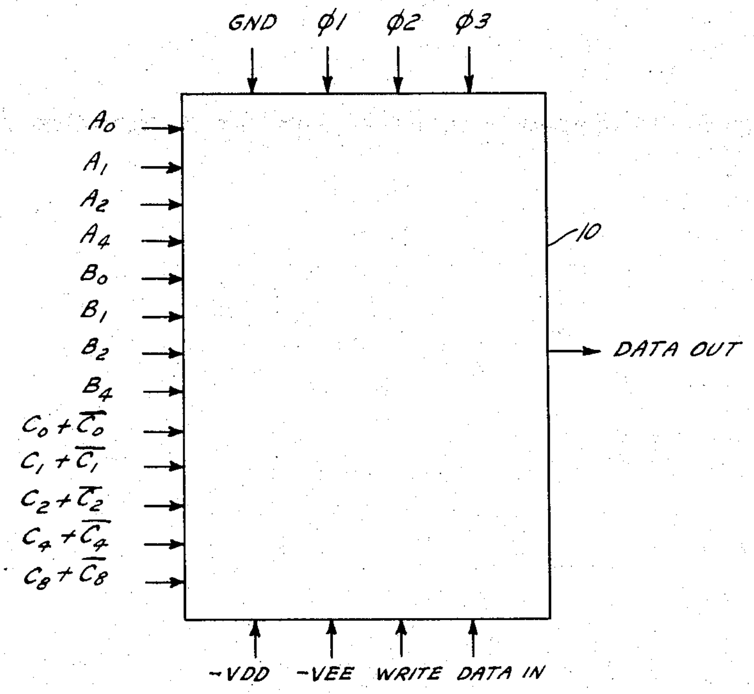
FIG. 1 is a schematic block diagram of a random access memory system in which the memory cell of the present invention is utilized, indicating the input signals to the system.
Figures 4A, 4B, 4C:
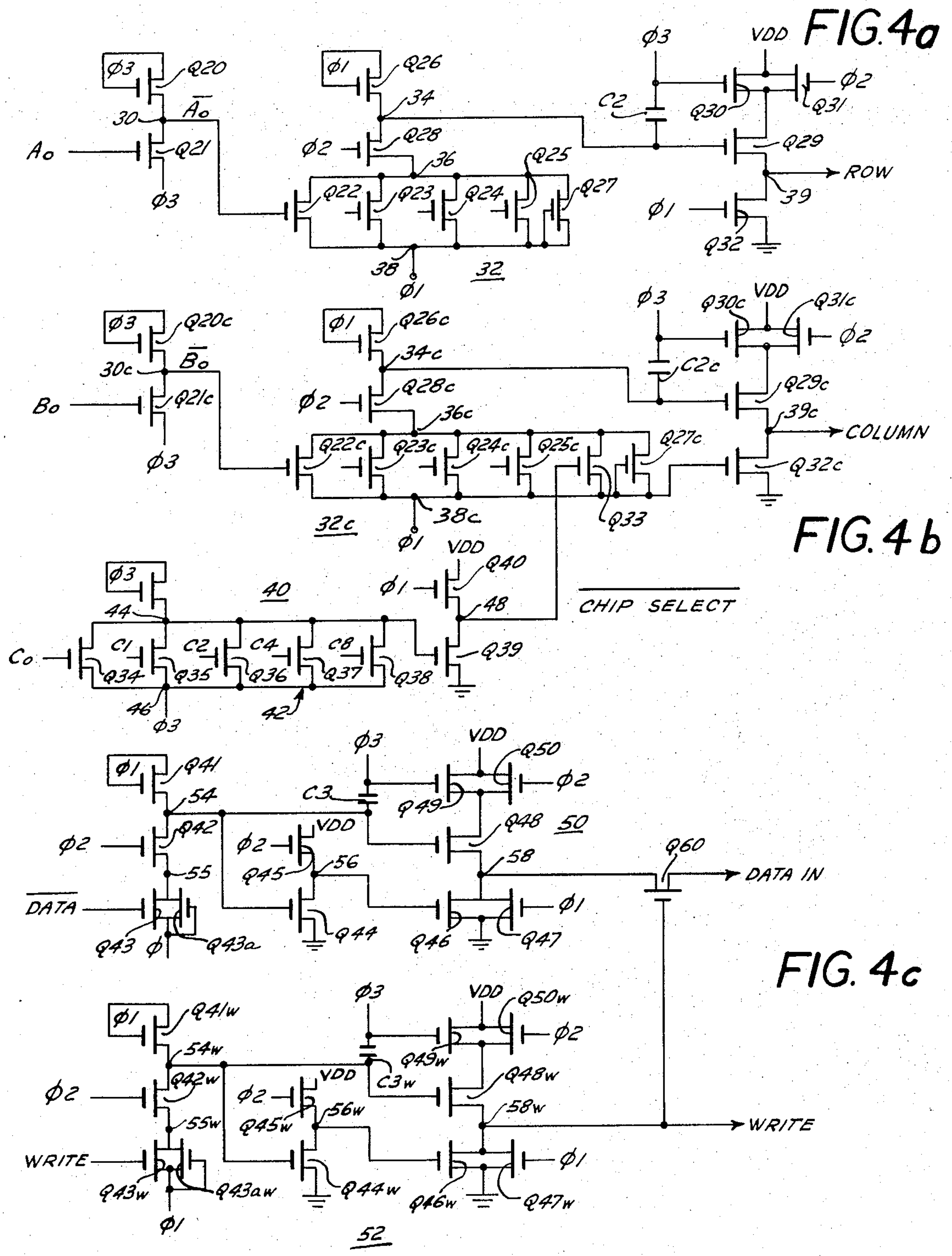
Figure 5:
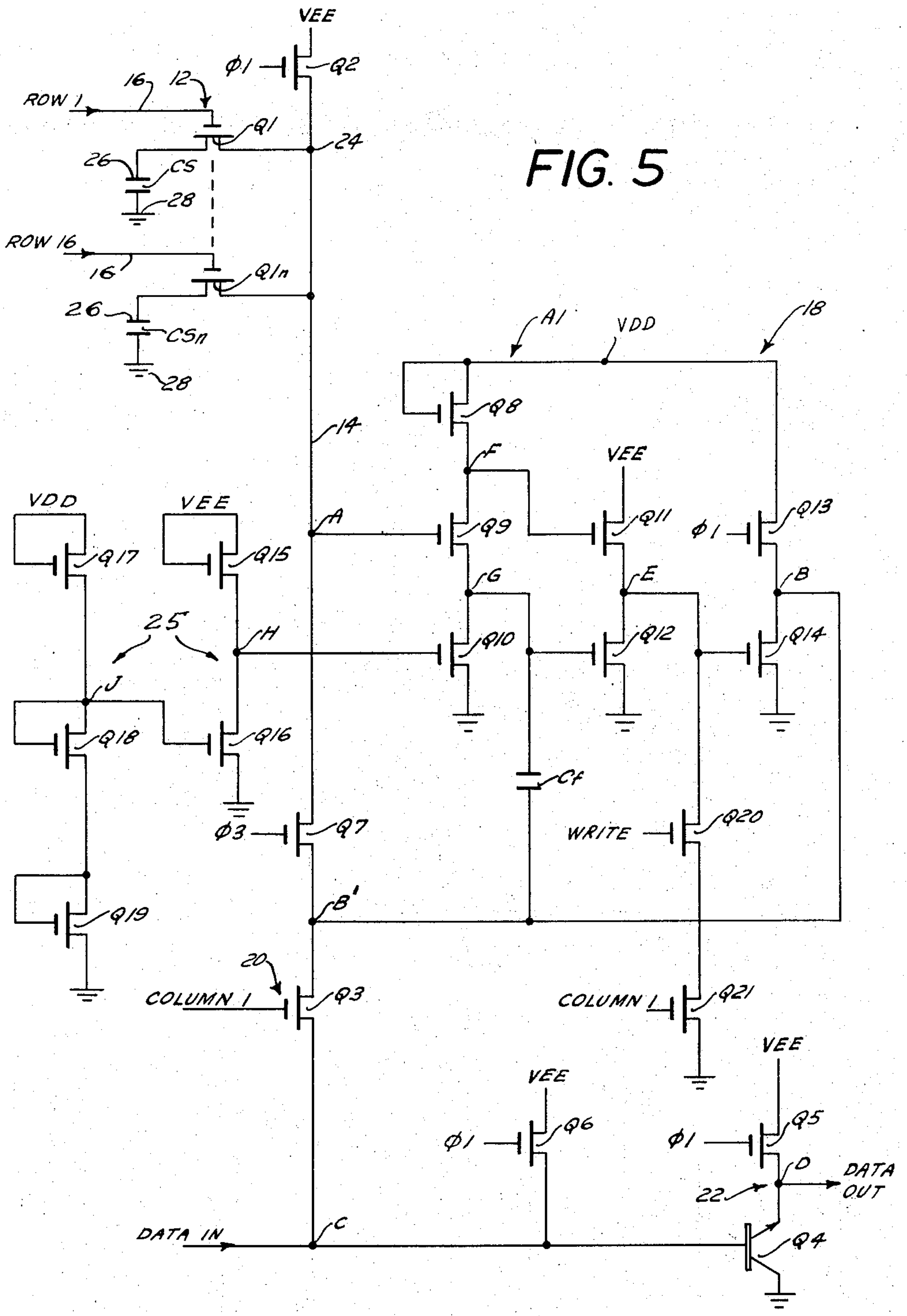

FIG. 4*a* is a circuit diagram of the row decoding circuit of the system;

FIG. 4*b* is a circuit diagram of the column decoding circuit of the system;

FIG. 4*c* is a circuit diagram of the Data and Write command circuit utilized in a write operation of the system; and FIG. 5 is a circuit diagram of the single device memory cell of this invention as incorporated in the memory system of FIG. 1 illustrating one column of that memory and showing the refresh amplifier, compensating circuit and output circuit associated with that column.

The present invention relates to a single device memory cell for use in a memory system of the random access type. The present disclosure also presents a description of a random access memory system incorporating such a single device memory cell and a novel data refresher incorporated into that system to assure that the data stored on the data storing element in the memory cell is not destroyed by a read operation of the data stored in that cell. The random access memory system herein specifically disclosed can be completely formed on a single chip of semiconductor material such as that designated 10 in FIG. 1. That chip contains a plurality of memory cells 12 arranged in a predetermined pattern. Each memory cell stores data at one of two discrete logic levels corresponding to a logic "1" condition or a logic "0" condition. Chip 10 preferably also contains the circuitry required for address selection and for data refreshing. If desired, a plurality of such chips may be connected together along with suitable chip select circuitry to form a memory system having increased data storage capacity. Chip 10 receives input row and column select signals as well as clock signals, operating voltages, and for a read-write system, Write and Data signals. For a system comprising a plurality of such chips, each chip in the system may also receive input chip select signals, and usually the complements of those signals.

Figure 2:
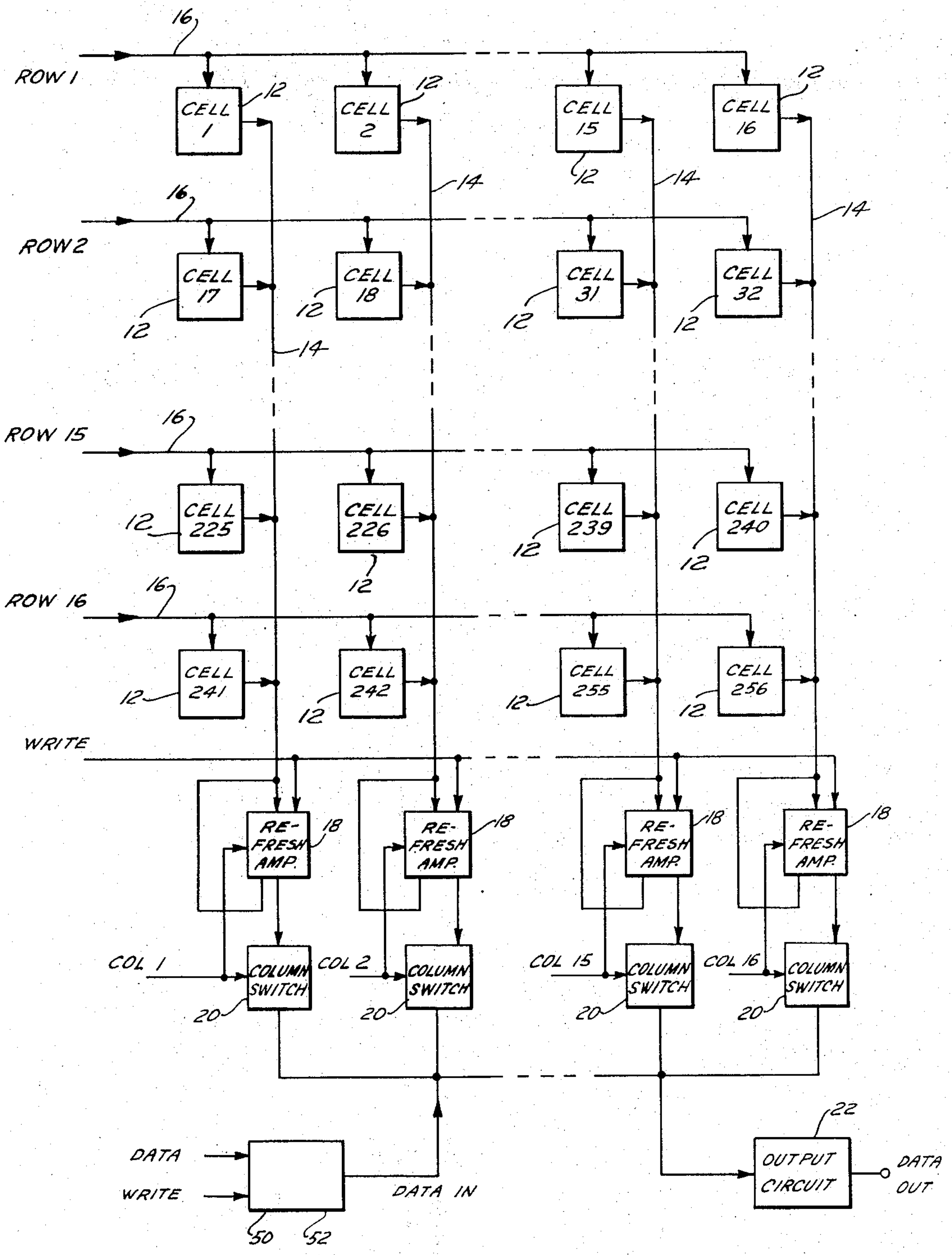
FIG. 2 is a schematic diagram illustrating the row and column arrangement of the memory cells of the memory system of FIG. 1 and the connection of the refresh amplifiers to the memory cells in each column of that system.

With reference to FIG. 2, the memory system particularly described herein comprises 256 memory cells 12 arranged in a plurality of intersecting rows and columns, there being sixteen rows and sixteen columns respectively forming at their intersections the addresses at which each of the memory cells 12 are located. The memory cells in a given column are each operatively connected to a column line 14 and each of the memory cells in a given row is operatively connected to a row select line 16. To select an address in the system for purposes of either "reading" the data signal stored at that address, or writing a new data signal at that address, the input row and column select signals are decoded in the system addressing circuitry to produce unique row and column signals for the selected row and selected column. Thus, if the selected address is at the intersection of row 1 and column 1, the row 1 select signal and the column 1 select signal will be uniquely negative, all other row and column select signals being at ground potential.

A refresh amplifier 18 is operatively connected to each of column lines 14 and is effective to refresh the data at the addressed memory cell in that column. As one memory cell in each column is addressed for a read operation, (i.e., the memory cell in the selected row) refreshing will occur at the selected memory cell in each column so that for each read operation the data at each memory cell in the selected row is automatically refreshed.

The data signal from each memory cell in the selected row is operatively connected to its corresponding column line 14 and thus to one terminal of an output switching device 20 which is controlled by the column select signal. As only one column select signal is effective (i.e., negative) for each read operation to actuate the corresponding output switching device 20, the data signal only at the selected column is transferred through the actuated device to data output circuit 22. The output signal of circuit 22 thus represents the data signal stored at the selected address. For a write operation, address selection is made in the same manner as in a read operation and a new data signal is directed to the selected memory cell at that selected address, refreshing of that selected cell being prevented by deactivating the refresh amplifier associated with the selected column. All other memory cells in the selected row are refreshed at that time as in a read operation.

The single device memory cell 12 of the present invention, shown in FIG. 5, comprises a single switching device in the form of a field effect transistor FET Q1 having a pair of output terminals designated the source and drain, and a control or gate terminal. One of the output terminals is connected at a point 24 to the column line 14, and its other output terminal is connected to one terminal of a data storage element 26 in the form of a data storing capacitor Cs, the other side of which is connected to ground at 28. The row select signal is applied at row select line 16 directly to the gate of FET Q1 so that if that cell is in the selected row, a negative signal is applied to the gate of FET Q1 which closes the output circuit path between its output terminals, thereby to transfer the signal from the data storing capacitor Cs to point 24. In the memory system of this invention, a plurality of such single device memory cells, corresponding to the number of rows in the memory, have their output circuits connected to each column line 14 as indicated by the FETs Q1 and Q1n (and data storing capcitor Csn) separated by the broken line in FIG. 5.

The data signal stored on capacitor Cs is at one of two discrete voltage levels corresponding to either the logic "1" or the logic "0," condition. For the particular circuit described in FIG. 5, a logic "0" condition is assumed to be established when a signal of substantially 0 volts or ground is stored on the data storing capacitor Cs, and a logic "1" condition is assumed when the signal level on that capacitor is equal to or more negative than −6 volts. For purposes of describing the operation of the circuit, the logic "1" condition will be assumed to be that condition when −6 volts is stored on capacitor Cs.

Figure 3:
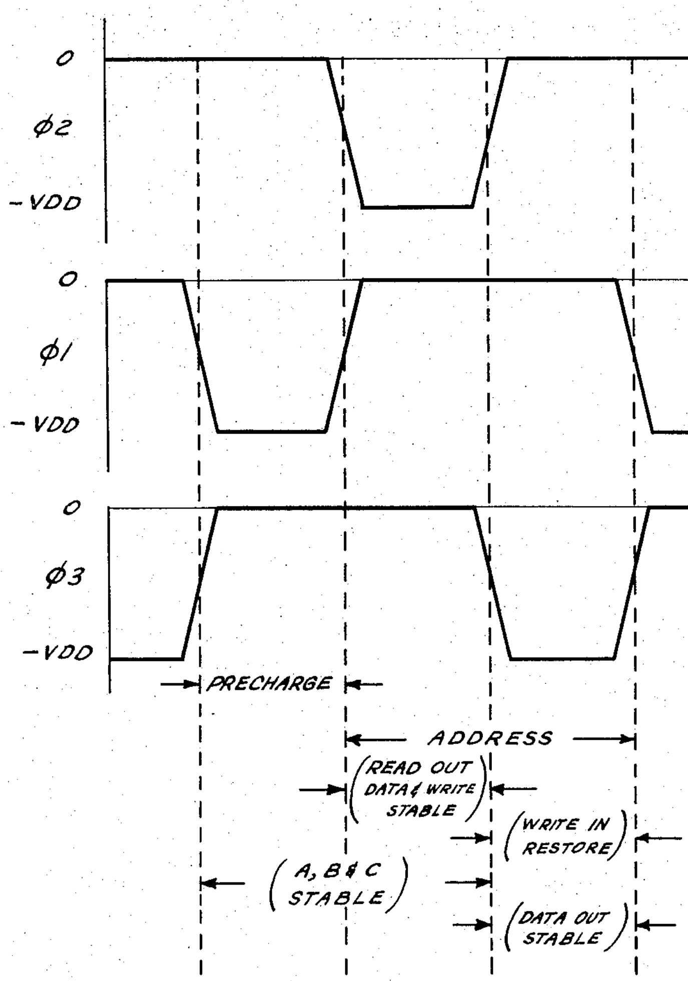
FIG. 3 is a timing diagram illustrating the time relationships between the clock signals utilized in the operation of that system.

The timing signals which control the operation of the memory, refreshing, and addressing circuits of the memory system are shown in FIG. 3 as comprising three unique clock phases, $\phi$1, $\phi$2 and $\phi$3. These signals are normally at ground level and are negative during their respective portion of a clock cycle at a level equal to the −24 volt level of the $V_{DD}$ supply. A second power supply voltage $V_{EE}$ having a nominal value of −12 volts is also provided to the system. The negative portion of each clock phase is referred to as the "time" of that phase, that is "$\phi$ 2 time" is the period during a clock cycle during which the $\phi$2 clock phase is negative.

As will be described with reference to the addressing circuitry of FIG. 4, row and column select signals are applied to the memory cells 12 only during $\phi$2 and $\phi$3 times, so that no operations are performed on the memory cells during $\phi$1 time.

To initiate a read operation, point 24 and thus node A are charged negatively during $\phi$1 time to the $-V_{EE}$ level through the output circuit of FET Q2 which is turned on during $\phi$1 time. At the beginning of $\phi$2 time, when the uniquely negative row select signal is applied to the gate of each memory cell in the selected row, the stored data signal at each data storing capacitor Cs in that row is transferred through the respective output circuits of FETs Q1, to cause a redistribution of the voltage between the voltage on capacitor Cs and the precharged voltage at node A. Node A in turn constitutes the input node to the refresh amplifier 18. As will be described, the signal level at the refresh amplifier output node B corresponds to the stored data level on the storing capacitor Cs. That signal is connected to node $B^1$ which in turn is connected to the output circuit of FET Q3, the gate of which receives the column select signal. FET Q3 thus defines the column switching device 20.

For the memory cell in the selected column, that column select signal is negative during $\phi$2 time and FET Q3 is rendered conductive, thereby to connect node $B^1$ to output node C, which in turn is connected to the base of an output buffer transistor Q4. Transistor Q4 acts as an emitter follower and as an impedance transformer to provide the desired low output impedance properly to drive the succeeding stages receiving the data signal from the memory system. The base of transistor Q4 is precharged negatively to the $V_{EE}$ voltage through the output circuit of FET Q6 which is conductive during $\phi$1 time, and its emitter is similarly precharged negatively at node D, the output node of the system, through the output circuit of FET Q5, also turned on during $\phi$1 time.

During $\phi$3 time, FET Q7 is turned on to connect the refresh amplifier output B to its input node A, and thus connects node B to point 24 and through the still conducting output circuit of FET Q1 to the data storing capacitor Cs. As the signal at node B represents the initially stored logic signal at data storing capacitor Cs, the signal applied to capacitor Cs from node B is effective to reestablish or refresh the data signal thereat. Data refreshing of this nature is required as the operative connection of capacitor Cs to node A through the output circuit of FET Q1 upon the application of row select signal to the gate of FET Q1 has the effect of "destroying" the data level originally stored at that storing capacitor as a result of the voltage redistribution between capacitor Cs and node A.

The refresh amplifier 18 is required to have the capability of responding quickly to the nature of the stored logic signal after it has been connected to the column line 14 at node A, and to produce a refresh signal which is an intensified version of that logic signal, so as to unambiguously and rapidly reestablish the logic level at data storing capacitor Cs. The amplifier 18 of this invention having these operating features comprises FETs Q8, Q9 and Q10 the output circuits of which are connected in series. The source and gate of FET Q8 are both tied to the $V_{DD}$ supply, the gate of FET Q9 is connected to node A, the input node of amplifier 18, and the drain of FET Q10 is connected to ground. A node F is defined at the junction of the output circuits of FETs Q8 and Q9, and a node G is similarly defined between the output circuits of FETs Q9 and Q10. A second branch of FETs Q11 and Q12 is provided, the output circuits of which are also connected in series. The gate of FET Q11 is connected to node F and its source is tied to the $V_{EE}$ line, and the gate of FET Q12 is connected to node G and its drain is connected to ground. A node E is defined at the junction of the output circuits of FETs Q11 and Q12. Amplifier 18 further comprises a pair of output FETs Q13 and Q14 the output circuits of which are connected in series. The source of FET Q13 is tied to the $V_{DD}$ line and its gate receives the $\phi$1 clock phase. The gate of FET Q14 is connected to node E and its drain is connected to ground. Node B, the output node of amplifier 18, is defined between the output circuits of FETs Q13 and Q14 and is connected by a feed back capacitor $C_F$ to the gate of FET Q12 and node G.

The operation of amplifier 18 for a read operation, assuming that the data stored at the storing capacitor Cs is at a logic "0" condition, (that is the voltage on that capacitor is substantially at ground potential) is as follows, it being assumed that the capacitance of the column line 14 to ground is approximately five times the capacitance value of the data storing capacitor Cs, the latter being typically 0.2 pf, and the capacitance to ground at node A being typically 1.0 pf.

During $\phi 1$ time, nodes A, C and D are precharged negatively to the $V_{EE}$ level through the output circuits of FETs Q1, Q6 and Q5 respectively, all of which are turned on during this time. Moreover, the amplifier output node B is charged negatively to a level one threshold below the $-V_{DD}$ level through the output circuit of FET Q13, also turned on during $\phi 1$ time. To maintain node B negative during $\phi 1$ time as desired, FET Q14 must be turned off; otherwise node B will be connected to ground through the output circuit of FET Q14. To maintain FET Q14 in its initial off condition, the signal at node E, connected to the gate of FET Q14, must be established during $\phi 1$ time at a level effective to maintain FET Q14 in that desired off condition. Moreover, to achieve the desired sensitivity and speed of response to amplifier 18, node E must be maintained at a level which enables FET Q14 to be rapidly turned on during $\phi 2$ time for one condition of the stored logic level at data storing capacitor Cs, and which insures that FET Q14 remains off for the other data storage condition at that capacitor at that time. Since, as a result of the ratio of the capacitances of the column line 14 and the data storing capacitor Cs, there is only a relatively slight variation at the level input of node A for each of the two logic conditions, the potential conductivity of FET Q14 as determined by the voltage at node E must be able to be placed in its proper state of conductivity (on or off) in response to this slight variation at node A.

To this end, the output circuits of FETs Q8, Q9 and Q10 are connected in series as an impedance ratio divider between the $V_{DD}$ supply and ground so that the potential levels at nodes F and G correspond to the impedance of the output circuit of FET Q9, which in turn is determined by the level of the negative drive signal applied to its gate from node A. As node A is precharged negatively during $\phi 1$ time to $-12$ volts, the drive on the gate of FET Q9 is increased at that time and the effective resistance of its output circuit is decreased so that the voltage level at node G becomes more negative and, at the same time, the level at node F becomes less negative, that is, it will be pulled closer to ground. The signal at node G thus follows in phase with the signal at the gate of FET Q9, i.e., the signal at node A, while the signal at node F is 180° out of phase with that signal. Reduced negative potential at node F decreases the drive to the gate of FET Q11, which in turn reduces the amount of negative voltage supplied to node E from the $V_{EE}$ supply through its output circuit. On the other hand, increased negative potential at node G increases the drive to the gate of FET Q12, thereby to increase the conductivity (.e., lower the impedance) of its output circuit. The series combination of FETs Q11 and Q12 acts as an impdance ratio stage, and since FET Q11 is not completely turned off by the reduced drive at its gate from node F the voltage level at node E is thus determined by the ratio of the impedances of the output circuits of FETS Q11 and Q12, which in turn are respectively determined by the negative drive signals applied to their gates. During $\phi 1$ time, that is, when node A is precharged to the $-12$ volt level, these ratios are selected such that the potential at node E, which controls the potential conductivity of FET Q14, is established at a level equal to approximately one-quarter to one-half of a threshold voltage more negative than ground. (A threshold voltage is that gate-to-source voltage required to turn on the FET, i.e., to cause current to flow between the source and drain terminals). As a result, if FET Q14 is to be turned on for a lobic "0" signal stored at data storing capacitor Cs as will be described, the potential at node E need be varied by only three-fourths to one-half of a threshold voltage before FET Q14 is turned on and yet for a slightly different voltage at node A, corresponding to a stored logic "1" condition, FET Q14 is maintained in its off condition.

During $\phi 2$ time the row select signal renders FET Q1 operative to connect capacitor Cs to point 24 and to node A, which it will be recalled, is precharged to $-12$ volts during $\phi 1$ time. For a stored logic "0" signal at capacitor Cs (i.e., ground,) the potential at node A and the capacitor Cs will be redistributed to establish a level of approximately $-10$ volts at both node A and on the capacitor, which has the instantaneous effect of destroying the data signal on capacitor Cs, and reducing the negative level at node A by approximately two volts. Assuming a constant level of the $V_{EE}$ supply and constant threshold voltage, the potential at node G, which follows the level at node A as described above, is made 2 volts less negative, thereby to turn off FET Q12. The drop in negative potential at node A also has the effect of charging the potential at node F more negative, to increase the negative drive to the gate of FET Q11 by approximately 2 volts. When FET Q12 is turned off, the potential at node E precharges more negatively towards the $V_{EE}$ supply level, the rate of that charging being increased by the increased drive supplied to the gate of FET Q11 from node F. The output circuit of FET Q11 provides the path from the $V_{EE}$ supply to node E. When the potential at node E becomes sufficiently negative as a result of the operation of FETs Q11 and Q12, FET Q14 is turned on and node B quickly charges to ground. That ground potential is transferred to node $B^1$ and through the conducting output circuit of FET Q3, (which is turned on by the column select signal) to node C which in turn is connected to the base of the PNP data output transistor Q4, turning the latter on to produce a ground potential at output node D. A ground potential on the data storing capacitor Cs produces a ground potential at node D, and the stored data signal is thus "read" and appears at the memory system output at node D.

The coupling of the signal at node B through the feedback capacitor $C_F$ to node G increases the speed of response of amplifier 18 by supplying the node B voltage to the gate of FET Q12 to increase the rate at which that transistor turns off, which in turn increases the rate at which the level at node E goes negative, thereby increasing the rate at which FET Q14 is turned on. This regenerative effect serves to increase the speed at which the desired output signal is developed at node B.

As stated above, the signal level at the data storing capacitor Cs temporarily becomes $-10$ volts, a clearly incorrect level for storage at logic "0" condition. To correct for this, the data level at node B, which is at ground for this condition, is connected, through the output circuit of FET Q7, which is turned on during $\phi 3$ time, back to node A and point 24, and then through the still conducting output circuit of FET Q1, to reestablish the desired correct potential at data storing capacitor Cs. (Point 24 and node A are no longer affirmatively tied to the $V_{EE}$ supply; the clock phase $\phi 1$ is, at this time, positive and FET Q2 is thus in its non-conducting condition.)

In summary, the logic "0" data signal at the data storing capacitor Cs is effective to modify the potential level at the input node A of refresh amplifier 18 to produce a signal at the output of that amplifier (at node B) corresponding to that stored data level, which latter signal is applied to the system output (node D) during $\phi 2$ time, and during $\phi 3$ time is fed back to data storing capacitor Cs in a manner effective to reestablish the desired logic condition thereat.

For a logic "1" condition, the voltage at the storing capacitor Cs is approximately equal to or more negative than −6 volts. For a "read " operation on that data level, node A is once again precharged negatively to −12 volts during $\phi 1$ time. During $\phi 2$ time, when the unique row select signal connects the data storing capacitor Cs to node A, a voltage redistribution once again occurs at node A, to establish a voltage level of approximately −11 volts at both node A and on the data storing capacitor Cs. The 1 volt drop in potential (from −12 volts to −11 volts) at node A causes a corresponding 1 volt less negative potential to be developed at node G and a similar 1 volt increase in the negative voltage level at node F. That reduction in the level at node G reduces the negative drive on the gate of FET Q12, but since it is only one volt less than in the logic "0" read operation described above, the resulting potential at node E is not sufficiently negative to switch FET Q14 into a conductin condition. Node B, hich was precharged to approximately −17 volts during $\phi 1$ time, that is,one threshold drop from the −24 volt level of the $V_{DD}$ supply, and node C which was precharged to −12 volts during $\phi 1$ time through the output circuit of FET Q6, are connected together during $\phi 2$ time through the output circuit of FET Q3 which is turned on by the unique column select signal. These nodes are thus charged to a negative level of approximately −13 volts between their initially precharged levels during $\phi 2$ time. During $\phi 3$ time, FET Q7 is turned on to connect node B to the data storing capacitor Cs to reestablish the voltage level at capacitor Cs to approximately −12 volts, the correct level for a logic "1" storage. As node C remains negatively charged, a negative signal is applied to the base of output transistor Q4 and a corresponding negative output data signal appears at output data node D.

For originally stored levels on data storing capacitor Cs more negative than −6 volts, (i.e. a logic "1" condition) the operation of refresh amplifier 18 and output circuit 22 is substantially the same as that for a logic "0" condition except that there is less of a reduction in the voltage level developed at node A during $\phi 2$ time, which in turn maintains node E at a level insufficient to turn on the output circuit of FET Q14 so that the signal at node B remains negative, as desired for a logic "1" condition.

For a "write" operation, a new data signal is directed and stored into the data storing capacitor of the selected address, and the addressing procedure is essentially th same as that for a read operation, that is, a row and a column are uniquely selected. Refreshing at that selected column is,however, prohibited while all other data cells in the selected row in the unselected columns are refreshed. To this end, FETs Q20 and Q21 are connected with their output circuits in series between the gate of FET Q14 and ground. The gate of FET Q20 receives the Write signal derived from the data drive circuit which will be described below, and the gate of FET Q21 receives a column select signal similar to that received by the gate of FET Q3. The Data In signal, also derived from data drive circuit, is applied directly to node C. A corresponding signal appears at data output node D but is of no import during a "write" operation. For a "write" operation to be performed in the selected column, both the Write and the column select signal are negative so that the output circuits of FETs Q20 and Q21 as well as that of FET Q3 are turned on; hence node E and the voltage applied to the gate of FET Q14 are tied to ground through the output circuits of FETsQ20 and Q21, thereby maintaining FET Q14 in its off condition, independent of the voltage levle at node A. This effectively deactivates the refresh amplifier 18 associated with the selected column. The Data In signal is connected through the conducting output circuits of FET Q3 and FET Q7 during $\phi 3$ time to point 24 and through the conducting output circuit of FET Q1 to establish a new data signal corresponding to the Data In signal at the data storing capacitor Cs.

As stated above, the potential at node E must remain within a present fraction of a threshold voltage to insure proper operation of FET Q14 and thus of refresh amplifier 18 for either of the two possible logic conditions stored at the data storing capacitor Cs. As we have seen, the difference in the potential level at input node A for the two logic conditions is approximately only one volt, so that control of the quiescent voltage at node E during $\phi 1$ time is critical for the proper operation of amplifier 18. That potential level at node E is in part controlled by the value of the negative $V_{EE}$ voltage supply.

In systems in which the $V_{EE}$ supply drives a great number of circuits, such as the sixteen refresh amplifiers, the $V_{EE}$ supply tends to vary from its nominal −12 volt value. If that supply becomes more negative than its nominal value, node A charges to a correspondingly more negative value, as will node G, so that the drive to the gate of FET Q12 would increase, thus pulling the potential at node E too close to ground for proper control of FET Q14. On the other hand, if the $V_{EE}$ supply voltage becomes less negative than its nominal value the voltage level at node A and node G will likewise be less negative, and hence the potential at node E will become excessively negative due to the reduced drive applied from node G to the gate of FET Q12. As a result of the increased negative potential at node E, FET Q14 will be turned on during $\phi 1$ time, thereby to connect node B to ground. Under this condition, refresh amplifier 18 would not operate in its desired manner, as node B must be charged to a negative potential during $\phi 1$ time.

For this reason, a compensation circuit generally designated 25 is provided to correct the voltage at node G and node F for variations in the $V_{EE}$ supply. Circuit 25 comprises FETs Q15 and Q16 connected with their output circuits in series, a node H being defined at the junction of these output circuits. The source and gate of FET Q15 are both tied to the $V_{ee}$ supply, and the source of FET Q16 is connected to ground. When the $V_{EE}$ supply drifts to a more negative level than its nominal value, the potential at node H becomes more negative because it is connected to the $V_{EE}$ supply through the output circuit of FET Q15 which is constantly maintained in the conducting state by the application of the negative $V_{EE}$ supply to its gate. That increased negative voltage is applied to the gate of FET Q10 and increases the drive to that gate to lower the effective impedance of the ouput circuit of FET Q10. This in turn tends to pull the voltage at node G closer to ground. However, the increased negative $V_{EE}$ supply is also reflected in the precharged voltage at node A which has the effect of increasing the negative drive applied to the gate of FET Q9 which has the reverse effect on node G, that is, the reduced impedance of the output circuit of FET Q9 tends to drive node G more negative. The overall result of the counterbalancing effects of FETs Q9 and Q10 is to maintain the level at node G substantially constant irrespective of fluctuations in the value of the $V_{EE}$ supply. As the level at node G thus remains substantially constant with variation in $V_{EE}$, a substantially constant potential is maintained at node E under those conditions, and the negative drive to the gate of FET Q12 is substantially unchanged. FET Q14 is thus securely maintained in its off condition by a predetermined voltage applied to its gate which enables the rapid turning on of FET Q14 for a proper logic level at the data storing capacitor Cs, as desired.

Operation of the compensation circuit 25 is similar for a drift of the $V_{EE}$ supply to a value less negative than its nominal value. When this occurs, the level at node H becomes less negative and decreases the drive to the gate of FET Q10 tending to make the level at node G more negative. The tendency is counterbalanced by the decreased level at node A which tends to make the voltage level at node G less negative, the result being a substantially constant level at node G and thus at node E with variations in $V_{EE}$.

Variation of the $V_{EE}$ supply from its nominal value also tends to drive node E from its nominal, critical level, since node E is connected to the $V_{EE}$ supply through the output circuit of FET Q11. However, for an increased negative level at node A resulting from an excessively negative $V_{EE}$ supply voltage, the voltage level at node F is less negative, that is closer to ground for reasons described above, thereby reducing the negative drive to the gate of FET Q11, which in turn reduces the conduction of the output circuit of FET Q11 to offset the effect on node E of the increased (more negative) $V_{EE}$ supply applied to node E through the output circuit of FET Q11. For a reduction in the negative level of the $V_{EE}$ supply the operation is similar, with the level at node F becoming more negative to increase the conduction of FET Q11 and thus to offset the reduced voltage which would otherwise be applied to node E through the output circuit of FET Q11.

The critical potential level at node E must also remain substantially constant for variations in the threshold voltage of the chip of semiconductor material on which the FETs of the memory system are formed. At the time of fabrication of the memory circuitry on a given chip, the threshold voltage is established but may vary from chip to chip. In a memory system comprising a plurality of such chips, all receiving common $V_{EE}$ and $V_{DD}$ supplies, the resulting node potentials, especially those potentials at nodes E, must remain constant and substantially equal to one another for all chips in that system even though different chips may have different threshold voltages. Moreover, the threshold voltage of an individual chip may itself vary from its initial value after a prolonged period of use. If the threshold voltage of a chip is higher than its nominal value, the potential at node G must be effectively made more negative to establish an increased negative drive on the gate of FET Q12 in order to maintain the potential at node E at its desired level.

If node G would remain at its nominal level, its effect on FET Q12 would be reduced as a result of the increased threshold voltage, and the potential at node E would be driven to an excessively negative level. However, the result of an increase in threshold voltage would have the reverse effect on node G, as for a given precharged voltage at node G, a higher than nominal threshold voltage drop between the source and gate of FET Q9 would tend to lower the potential at node G rather than raise it as is desired for an increase in the threshold voltage.

To correct for this condition compensating circuit 25 is further provided with a threshold compensating circuit comprising FETs Q17, Q18 and Q19 having their output circuits connected in series, a node J being defined at the junction of the output circuits of FET Q17 and FET Q18. That node is connected to the gate of FET Q16. The source and gates of FET Q17 are tied to one another and to the $V_{DD}$ supply, and the sources and gates of FETs Q18 and Q19 are respectively tied to one another, and the drain of FET Q19 is connected to ground. The potential established at node J is effectively equal to twice the threshold voltage of the chip as each of FETs Q18 and Q19 experiences a one threshold voltage drop across their output circuits as a result of the connection of their sources to their gates. For an increase in threshold voltage, the negative voltage at node J is likewise increased, thus increasing the negative drive to the gate of FET Q16, which in turn becomes more conductive, thus causing the potential at node H to become less negative, that is, move toward ground. As a result, the output circuit impedance of FET Q10 increases, which has the effect of driving the potential at node G more negative, as is desired to provide the additional drive to FET Q12 to compensate for the increase in the threshold voltage above its nominal value. Stated in other terms, the impedance of the output circuit of FET Q10 is modulated by the signal at the node H, the level of which is inversely proportional to the threshold voltage due to the change in potential at node J. The operation of the threshold equalizing circuit is similar when the threshold voltage drops below its nominal value; the negative level at node J is decreased, thus increasing the negative level at node H which in turn increases the drive on the gate of FET Q10, thereby to lower the impedance of its output circuit, which has the effect of driving node G less negative. The potential at node E is thus maintained substantially constant as desired, irrespective of possible variations in the threshold voltage. To insure that the potential at node J is not sensitive to changes in the $V_{DD}$ suppy, but only to changes in the threshold voltage, the relative size of FET Q17 is smaller than that of FETs Q18 and Q19 so that its output circuit impedance is much more than that of FETs Q18 and Q19 and the potential at node J reflects substantially only the threshold voltage of the chip as desired.

The address and data driving circuitry are shown in FIG. 4, FIG. 4a illustrating the row select circuitry, FIG. **4*b*** illustrating the column select circuitry,and FIG. 4c illustrating the circuitry for deriving the Data In and Write signals for use in a write operation on the memory.

For the memory as herein specifically described, in which the data locations are arranged at the intersections of 16 rows and 16 columns, the row select signal is derived from four input row signals $A_0$–$A_4$, and the column select signal is derived in a similar manner from four input column signals $B_0$–$B_4$. Each row and column select circuit comprises means for deriving the complements of their respective input signals, and to apply the permutations of the trues and complements of all input signals to a four input NOR gate. All inputs to only one of the row and column NOR gates are positive for only one such permutation, these NOR gates thus being the ones that derive the uniquely negative row select and column select signals. If the memory system is comprised of a plurality of the memories of FIG. 5 arranged on a corresponding plurality of chips, the address select signal also includes a chip select signal. Assuming that 32 such chips form a complete memory system, five chip select signals and their respective complements are also introduced to each chip 10 as shown in FIG. 1. A unique chip select signal is derived in a chip select circuit and is applied to the column select NOR gate so that addressing (i.e., column select) is effected only on the selected chip.

Data circuitry is provided to insure that the Data In signal and the Write signal are both stable at the end of $\phi 2$ time and during $\phi 3$ time during which, as described above, the Data In signal is transferred to the data storing capacitor in the memory cell 12 during a "write" operation.

FIG. 4a illustrates a typical row select circuit for one row of the memory, it being understood that the system comprises 16 of these circuits, each effective, if it receives the proper row select input signals, to produce a uniquely negative row select signal. FIG. 4*a* illustrates one row input signal $A_0$ and one inverter stage for producing the complement $\overline{A}_0$ of that input, it being understood that the memory system comprises four such inverters each receiving one of the four row input signals $A_0$–$A_4$, to produce the complements of these input signals. The trues and the complements produced by these inverters are applied to sixteen row NOR gates in specified, different permutations.

The inverter stage comprises FETs Q20 and Q21 having their output circuits connected in series. The source of FET Q20 is connected to its gate and the source of FET Q21 is tied to the $\phi 3$ clock phase. A node 30, which is defined between the output circuits of FET Q20 and FET Q21, is precharged negatively during $\phi 3$ time through the output circuit of FET Q20. If the row input signal $A_0$ is negative, FET Q21 is conductive and conducts the $\phi 3$ clock phase through the output circuit of FET Q21 to node 30. At times other than $\phi 3$ time, that clock phase is at ground so that at those times the signal at node 30 for a negative $A_0$ signal is positive, corresponding to an inversion of the data input row signal. Conversely, if the row input signal is positive, FET Q21 would remain non-conductive and the signal at node 30 would remain at its precharged negative level.

The row select NOR gate 32 comprises four FETs Q22 – Q25 connected with their output circuits in parallel. A node 34 is precharged negative during $\phi 1$ time through the output circuit of FET Q26, and a node 36 is also precharged negative during $\phi 1$ time through the output circuit of FET Q27 whose output circuit is connected in parallel with the output circuits of the FETs in NOR gate 32. The gate of FET Q27 is tied to the $\phi 1$ clock phase. FET Q28 has its output circuit connected between nodes 34 and 36 and its gate connected to the $\phi 2$ clock phase. The gates of FETs Q22 – Q25 each receive one of the permutations of the trues and complements of the row input signals, FET Q22 being shown as receiving the complement of the $A_0$ row input signal, $\overline{A}_0$. If the input to the gates of each of FETs Q22 – Q25 is positive, corresponding to the permutation of the row input signals for the selected row, there is no conducting path through the output circuits of any of FETs Q22 – Q25 between node 38, which receives clock phase $\phi 1$, and node 36, the latter thus being retained at its negative precharged condition.

Thus, for the selected row at times other than $\phi 1$ time, node 36 remains at its negative level and during $\phi 2$ time, that node is connected to node 34 through the output circuit of FET Q28, so that node 34 also remains at its negative precharged level. For all the fifteen unselected rows node 36 is charged to a positive level during $\phi 2$ time, that positive level being applied to node 34. Node 34 is connected to the gate of FET Q29 and is also connected through a capacitor C2 to the gate of FET Q30 whose output circuit is connected to the $V_{DD}$ supply. The output circuit of FET Q31 is connected in parallel with that of FET Q30 and receives the $\phi 2$ clock phase at its gate. For the selected row, the negative level at node 34 is sufficient to drive FET Q29 into conduction and during $\phi 3$ time that negative signal is combined with the $\phi 3$ clock phase to increase the negative drive at the gate of FET Q30, to turn the latter on. However, FET Q31 is conductive during $\phi 2$ time so that during $\phi$ 2 time the $V_{DD}$ supply is connected to a row select node 39 through the output circuits of FETs Q31 and Q29, and during $\phi 3$ time, a similar negative row select voltage is applied to node 39 through the output circuits of FET Q30 and FET Q29. Thus, for the selected row, a uniquely negative potential is developed at nods 39 during both $\phi 2$ time and $\phi 3$ time, that signal being applied to the gate of FETs Q1 in all the memory cells in that selected row. During $\phi 1$ time, node 39 is connected to ground through the output circuit of FET Q32, which receives the $\phi 1$ clock phase at its gate, to insure that all row select signals, including that for the selected row, will be at ground during $\phi 1$ time. It will be understood that for all unselected rows, the signal at node 34 is charged positive during $\phi 2$ time and thus FET Q29 remains off, thereby preventing the negative voltage supply from the $V_{DD}$ supply from being connected to output node 39, the latter thus remaining at its ground potential established thereat during $\phi 1$ time.

The operation of the column select circuit shown in FIG. 4b is substantially the same as that of the row select circuit with corresponding FETs having similar reference numerals with the suffix *c* thereafter. In brief, the column input signals are inverted and the trues and complements of these signals are applied to the four inputs of the column NOR gate 32*c* which produces a negative signal at node 34*c* during $\phi 2$ time only for the selected column. NOR gate 32*c* differs from row select NOR gate 32 in that it comprises an additional transistor FET Q33 the output circuit of which is connected in parallel with FETs Q22*c* – Q25*c* and FET Q27*c*. FET Q33 receives the complement of the chip select signal at its gate, that signal being derived at a chip select circuit 40 which comprises a five input NOR gate 42 comprising FETs Q34 – Q38 connected in parallel each receiving one of the trues or complements of the input chip select signals. NOR gate 42 comprises a node 44 which is precharged negative during $\phi 3$ time and a node 46 which receives the $\phi 3$ clock phase. For the selected chip all five inputs to NOR gate 42 are positive and node 44 remains at its negative precharged level at times other than $\phi 3$ times. That signal is applied to the gate of FET Q39 whose output circuit is connected between a node 48 and ground, node 48 being charged negatively during $\phi 1$ time through the output circuit of FET Q40. Thus, for the selected chip, FET Q39 receives a negative signal at its gate to turn that transistor on and to connect node 48 to ground. The signal at node 48 thus represents the inverse of the chip select, or the $\overline{\text{chip select}}$, signal which is positive only for the selected chip. That signal is applied to the gate of FET Q33 in column select NOR gate 32c so that the column select circuit on only the selected chip produces a negative column select signal. In this manner, data is either read from or written into the selected address on the selected chip; a data readout and the transfer of a new data signal to the data storing capacitor Cs requires the presence of a negative column select signal at the gate of FET Q3. The row and column select signals are present and stable at their uniquely negative levels during $\phi 2$ time and $\phi$ 3 time as desired for memory operation.

The data driving circuit comprises two stages, a data stage 50 and a write stage 52. The output of stage 50 is applied to the output circuit of an FET Q60, and the output of write circuit 52 is applied to the gate of that transistor. Thus, a Data In signal is applied to the memory from the data driving circuit only during the presence of an input Write command signal which is effective to render FET Q60 conductive.

Stage 50 comprises an inverter stage comprising FETs Q41, Q42 and Q43 whose output circuits are connected in series. A node 54 is defined between the output circuits of FETs Q41 and Q42 and is negatively precharged during $\phi 1$ time through the output circuit of FET Q41 the source of which is connected to its gate. The $\overline{\text{Data}}$ signal, or the complement of the Data signal, is applied to the gate of FET Q43 and when negative during $\phi 2$ time, (during which time the $\phi 1$ clock phase applied to the drain of FET Q43 is positive) renders FET Q43 conductive to transfer the positive $\phi 1$ clock phase through the output circuit of FET Q42, which is turned on during $\phi 2$ time, to charge node 54 positive. On the other hand, if the $\overline{\text{Data}}$ signal is at ground, FET Q43 is not turned on so that node 54 remains at its precharged negative level. Node 54 is connected to the gate of FET Q44 whose output circuit is connected between a node 56 and ground. Node 56 is charged negative during $\phi 2$ time through the output circuit of FET Q45 whose output circuit is also connected to the $V_{DD}$ voltage supply. Node 56 is connected to the gate of transistor Q46 which is connected in parallel between ground and a node 58 with FET Q47, the latter receiving the $\phi 1$ clock phase at its gate. Node 54 is also connected to the gate of FET Q48 and through a capacitor C3 to the gate of FET Q49, the latter also receiving the $\phi 3$ clock phase. FET Q50 is connected in parallel with FET Q49 between the $V_{DD}$ supply and the output circuit of FET Q48. A negative voltage at node 54, corresponding to a negative Data signal, causes FET Q44 to be turned on and node 56 to be connected to ground. That ground signal is applied to the gate of FET Q46, thereby to turn the latter off. At the same time the negative potential at node 54 is effective to turn FET Q48 on, and during $\phi 3$ time, to turn FET Q49 on, thereby to transfer, during $\phi 3$ time, the negative $V_{DD}$ voltage to node 58. Similarly, during $\phi 2$ time, the $V_{DD}$ signal is transferred to node 58 through the output circuit of FET Q50 and the output circuit of FET Q48 which is conductive only for a negative signal at node 54. On the other hand, for a positive signal at node 54, corresponding to a positive or ground Data signal, FET Q44 remains turned off and node 56 remains at its negative precharged level to turn FET Q46 on, thereby to connect node 58 to ground through the output circuit of FET Q46. The signal level at node 58 thus corresponds to the true level of the Data signal, i.e. it will be negative when the Data signal is negative and the $\overline{\text{Data}}$ signal is positive, and will be positive when the Data signal is positive and, accordingly, when the $\overline{\text{Data}}$ signal is negative. During $\phi 1$ time node 58 is connected to ground through the conducting output circuit of FET Q47 which is conductive only during $\phi 1$ time. The Data signal thus appears at node 58 during $\phi 1$ and $\phi 3$ times only. FET Q43*a* is connected in parallel with FET Q43 and has the $\phi 1$ clock phase applied to its gate to precharge a node 55, defined at the junction of FETs Q42 and Q43, negative during $\phi 1$ time. If the $\overline{\text{Data}}$ signal is positive, the negative level at node 55 is connected through the output circuit of FET Q42 during $\phi 2$ time to augment the desired negative level at node 54.

The operation of circuit 52 is substantially the same as that of circuit 50 and is therefore only briefly described herein, circuit components in circuit 52 corresponding to those in circuit 50 being indentified with similar reference numerals, the suffix *w* being added to the components of circuit 52 to distinguish them from the corresponding components in circuit 50. Thus, for a positive $\overline{\text{write}}$ signal, indicating the presence of a Write command signal to the memory, a negative level is produced at node 54*w* which is effective to develop, during $\phi 2$ and $\phi 3$ times, a negative write command signal at node 58*w*, which in turn is applied to the gate of FET Q60 to transfer the Data signal from node 58 to node C of the memory of FIG. 5 only during the presence of a Write command represented by a negative signal at the gate of FET Q60. The negative write signal at node 58*w* is also used to control the operation of FET Q20 in the refresh amplifier 18 to prevent refreshing of a memory cell during a write operation into that memory cell. In other respects, the manner of operation of circuits 50 and 52 is identical.

The present invention has thus provided a read-write memory in which a plurality of memory cells are arranged in a predetermined manner. Each memory cell comprises only a signal switching device in the form of an FET, the data storing element being in the form of a capacitor connected to the output circuit of the FET. The memory cells are advantageously located at the intersection of a plurality of rows and columns. The row select signal is applied to the gate of that memory cell FET and when uniquely negative, as for a row select operation, transfers the data signal stored on its associated storing element to a column line. The column line is selectively, operatively connected to the system data output node through a second switching device which is controlled by the column select signal.

A refresh amplifier is operatively associated with each of the columns in the memory and provides means for restoring the data signal at the data storing element in each memory cell in the selected row during a read operation, thereby to insure that the data signal is not destroyed thereat during a read operation as would otherwise occur. The novel design of the refresh amplifier enables a rapid response to the level of the stored logic signal to insure rapid, reliable and accurate refreshing of the data signal at the data storing element. Means are also provided to assure that the refresh amplifier operates in this manner irrespective of variations in one of the system power supplies as well as variations from a nominal threshold voltage of the chip on which the memory circuit is formed.

The memory systems may be expanded by forming a plurality of such chips each comprising a specified number of memory cells of the type described, the column select circuitry being integrated with the chip select circuitry so that only the selected row-column location of the selected chip produces a data signal at the system data output node.

The circuitry is designed for minimum power dissipation and has the capability of being entirely formed on a single chip of semiconductor material, thereby providing an increased data storage capacity within a given volume. That capacity is further increased by the use of only a single field effect transistor in each of the memory cells as compared to at least three such devices required in the heretofore known memory cells using field effect transistors and the like.

A read operation on the data stored in the selected memory cell is performed in a non-destructive manner as a result of the almost instantaneous refreshing of the data signal in that cell and may be performed in a random-access manner, that is, any cell within the memory may be instantaneously addressed. A write operation may be performed into the selected memory cell also in a random-access manner, and the refreshing operation at that cell is prevented by proper logic signals applied to the refresh amplifier.

While only a signal embodiment of the present invention has been herein specifically disclosed, it will be apparent that many variations may be made thereto without departure from the scope of the invention.

We claim:

1. A memory cell for use in a memory system in which a plurality of such cells are adapted to be arranged at a plurality of address stations in said system, said cell comprising a first switching device having first and second output terminals and a control terminal, means operatively connected to one of said output terminals for storing a data signal at one of two logic levels, a data output node connected to the other of said output terminals, and address selecting means selectively operatively connected to said control terminal and effective when present to actuate said switching device and operatively connect said first and second output terminals, thereby to transfer said data signal from said storing means to said output node, amplifier means having an input and an output, said input being operatively connected to said data output node, and a second switching device operatively interposed between said input and output, actuated by a timed signal, and effective when actuated to sense and refresh the signal on said data storing means.

2. The memory cell of claim 1, in which said amplifier means comprises a first signal source of a sense corresponding to but at a level greater than the level of one of said stored logic levels, and a second signal source of a reference signal corresponding to the other of said logic levels, means effective to initially charge said output to the level of said first signal, third switching means having a first output terminal operatively connected to said output, a second output terminal operatively connected to said reference signal, and a control terminal operatively connected to said input and effective to actuate said third switching means when said stored logic level is at said other of its levels, thereby to charge said output to said reference signal.

3. The memory cell of claim 2, said amplifier means further comprising an intermediate node operatively connected to the control terminal of said third switching means, and means for establishing a bias level at said intermediate node at a value which is effective to normally deactuate said third switching means.

4. The memory cell of claim 3, further comprising a second intermediate node, fourth switching means having an output circuit operatively connected between said first mentioned intermediate node and said reference signal and a control terminal operatively connected to said second intermediate node, and capacitive feedback means operatively connected between said output and said second intermediate node.

5. The memory cell of claim 4, further comprising a third signal source corresponding in sense but of a lesser magnitude than said first-mentioned signal source, fifth switching means having an output circuit operatively connected to said third signal source and said first intermediate node and defining along with said fourth switching means said bias level establishing means.

6. The memory cell of claim 5, further comprising compensating means operatively connected to said second intermediate node and to said third signal source and effective to compensate for variations in the level of said third signal source, and to maintain the voltage at said second intermediate node substantially constant.

7. The memory cell of claim 6, said compensating means comprising sixth switching means having an output circuit operatively connected to said second intermediate node and a control terminal, a compensating node operatively connected to the control terminal of said sixth switching means, and means effective to establish a signal level thereat proportional to the level of said third signal.

8. The memory cell of claim 1, in which said first switching device is a field effect transistor having a gate defining said control terminal and a source and drain defining said output terminals, said data storing means comprising capacitance means.

9. The combination of claim 8, in which said amplifier means comprises a first signal source of a sense corresponding to but of a level greater than the level of one of said stored logic levels, and a second signal source of a reference signal corresponding to the other of said logic levels, means effective to initially charge said output to said first signal level, third switching means having a first output terminal operatively connected to said output, a second output terminal operatively connected to said reference signal, and a control terminal operatively connected to said input and effective to actuate said third switching means when said stored logic level is at said other of its levels, thereby to charge said output to said reference signal.

10. The combination of claim 9, said amplifier means further comprising an intermediate node operatively connected to the control terminal of said third switching means, and means for establishing a bias level at said intermediate node at a value which is effective to normally deactuate said third switching means.

11. The combination of claim 10, further comprising a second intermediate node, fourth switching means having an output circuit operatively connected between said first mentioned intermediate node and said reference signal and a control terminal operatively connected to said second intermediate node, and capacitive feedback means operatively connected between said output and said second intermediate node.

12. The combination of claim 11, further comprising a third signal source corresponding in sense but of a lesser magnitude than said first mentioned signal source, and fifth switching means having an output circuit operatively connected to said third signal source and said first intermediate node and defining along with said fourth switching means said bias level establishing means.

13. The combination of claim 12, further comprising compensating means operatively connected to said second intermediate node and to said third signal source and effective to compensate for variations in the level of said third signal source, and to maintain the voltage at said second intermediate node substantially constant.

14. The combination of claim 13, said compensating means comprising sixth switching means having an output circuit operatively connected to said second intermediate node and a control terminal, a compensating node operatively connected to the control terminal of said sixth switching means, and means effective to establish a signal level at said compensating node proportional to the level of said third signal.

15. A memory system comprising a plurality of memory cells arranged at the intersections of a plurality of intersecting rows and columns, each of said memory cells comprising a switching device having a control terminal and a normally open output circuit and data storing means operatively connected to one side of said output circuit for storing a data signal at one of two discrete logic levels, an output terminal, conductor means operatively connected to the other sides of the output circuits of all said switching devices in a given column, address selecting means including row and column select means, said row select means being operatively connected to said control terminal of said switching devices in the selected row of each of said columns and effective to close the output circuits of said devices in the selected row and to operatively apply the data signal from said data storing means to said conductor means, and first switching means effective when actuated to operatively connect a predetermined one of said conductor means to said output terminal, said column selecting means being effective to actuate said first switching means, thereby to operatively connect said conductor means in the selected column to said output terminal, and signal amplifier means having an input and an output, said input being operatively connected to said conductor means, and second switching means operatively interposed between said conductor means and said amplifier output, actuated by a timed signal, and effective when actuated to sense and refresh the voltage on said storing means.

16. The memory system of claim 15, in which said amplifier means comprises a first signal source of a sense corresponding to but at a level greater than the level of one of said stored logic levels, and a second signal source of a reference signal corresponding to the other of said logic levels, means effective to initially charge said output to the level of said first signal, third switching means having a first output terminal operatively connected to said output, a second output terminal operatively connected to said reference signal, and a control terminal operatively connected to said input and effective to actuate said third switching means when said stored logic level is at said other of its levels, thereby to charge said output to said reference signal.

17. The memory system of claim 16, said amplifier means further comprising an intermediate node operatively connected to the control terminal of said third switching means, and means for establishing a bias level at said intermediate node at a value which is effective to normally deactuate said third switching means.

18. The memory system of claim 17 further comprising a second intermediate node, fourth switching means having an output circuit operatively connected between said first mentioned intermediate node and said reference signal and a control terminal operatively connected to said second intermediate node, and capacitive feedback means operatively connected between said output and said second intermediate node.

19. The memory system of claim 18, further comprising a third signal source corresponding in sense but of a lesser magnitude than said first mentioned signal source, and fifth switching means having an output circuit operatively connected to said third signal source and said first intermediate node and defining along with said fourth switching means said bias level establishing means.

20. The memory system of claim 19, further comprising compensating means operatively connected to said second intermediate node and to said third signal source and effective to compensate for variations in the level of said third signal source, and to maintain the voltage at said second intermediate node substantially constant.

21. The memory system of claim 20, said compensating means comprising sixth switching means having an output circuit operatively connected to said second intermediate node and a control terminal, a compensating node operatively connected to the control terminal of said sixth switching means, and means effective to establish a signal level at said compensating node proportional to the level of said third signal.

22. A memory system comprising a memory cell comprising a switching device having a control terminal and a normally open output circuit and data storing means operatively connected to one side of said output circuit for storing a data signal at one of two discrete logic levels, a signal node operatively connected to the other side of said switching device output circuit, first control means operatively connected to said switching device control terminal and effective to cause said switching device output circuit to be closed, thereby to connect said data storing means to said signal node during first and second time intervals and to be open during a third time interval, all of said time intervals being substantially mutually exclusive, signal refreshing means, second control means operatively completing an operative connection from said signal node through said signal refreshing means and back to said signal node during said second time interval, an output terminal, third control means operatively completing an operative connection from said signal node to said output terminal during a time interval other than said first and second time intervals, biasing means, and fourth control means effective to operatively connect said biasing means to said signal node only during said third time interval.

23. The system of claim 22, in which said third control means is operative to complete its connection during said first time interval.

24. The system of claim 23, in which said third control means is operative to complete its connection substantially during both said first and second time intervals.

* * * * *